April 17, 1956  J. N. DEW ET AL  2,742,342
METHOD OF AND APPARATUS FOR VAPORIZATION OF SUBLIMATE SOLIDS
Filed June 10, 1952
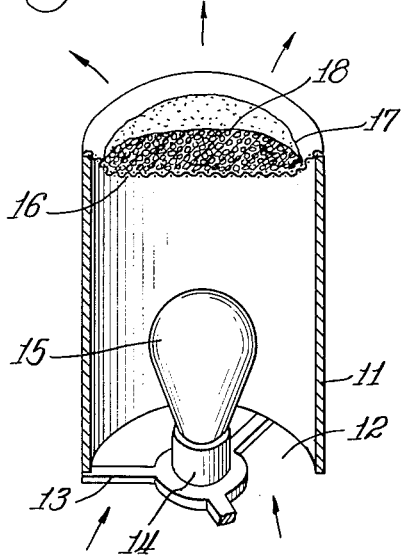
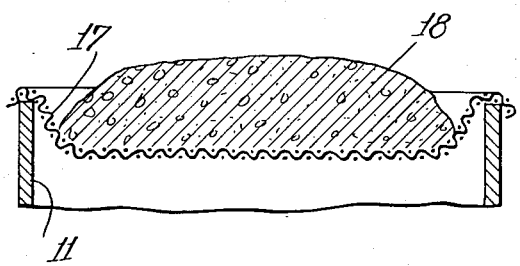
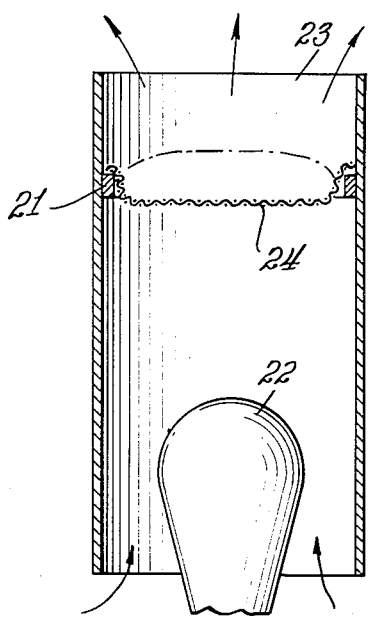
INVENTORS:
John N. Dew and
Cedomir M. Sliepcevich
By:- Watson D. Harbaugh
atty.

United States Patent Office 2,742,342
Patented Apr. 17, 1956

2,742,342

METHOD OF AND APPARATUS FOR VAPORIZATION OF SUBLIMATE SOLIDS

John N. Dew and Cedomir M. Sliepcevich, Ann Arbor, Mich.

Application June 10, 1952, Serial No. 292,662

4 Claims. (Cl. 21—53)

The present invention relates to volatilizers for the dispersion of insecticides and concerns itself more particularly with apparatus of this class whose output lends itself to be controlled critically for the purpose of maintaining a constant gradient or admixture ratio in respect to atmosphere.

The vapors of certain volatile or sublimate solids possess pesticidal characteristics in the treatment of confined spaces such as those used for habitation or storage. Lindane (benzene hexachloride) and paradichlorobenzene are examples of vapor forming chemicals utilized in this fashion. Most, if not all chemical solids of this class require to be regulated percentagewise in respect to their admixture with atmospheric air intended to be occupied by mammals or flora. Otherwise, and with major concentrations of certain chemicals, lethal or irritating conditions may result which would be definitely injurious or hazardous.

In the opposite direction, certain minimum concentrations are essential to efficacy. Moreover, for different solids there are different ranges of efficient concentration between these extremes of efficacy and hazard.

The problems with which this invention concerns itself are to be distinguished from those arising out of conventional fumigation, or similar treatment of sealed chambers. The present invention contemplates, in fact, a practice of treating atmospheres which may be attended by maximum conditions of air circulation and constant occupation by human habitation, plant life, and exposure to food supply.

A principal object of the present invention, therefore, is to provide a disseminating apparatus for vaporizing insecticidal solids which is reliable and enduring in its operation, economical in cost and maintenance, and universally adaptable to dwellings, office and business buildings, auditoriums or the like.

Another object of the present invention is to provide a noiseless vaporizing apparatus for chemical solids which will effectively accelerate the sublimation and volatilization characteristics of certain chemical solids without requiring substantial elevation of temperature such as would produce melting or without crusting together of porous solids.

A still further object of the present invention is to completely evaporate chemical solids which are suitable for atmosphere conditioning by augmenting a low-level supply of heat for evaporation with a continuous draft current directed to permeate a chemical charge arranged in a permeable layer, and to assist in the carrying away of liberated vapors immediately that they are released, even under conditions when such gases are heavier than atmosphere, whereby to disseminate them throughout a space chamber evenly.

Under other practices of atmospheric diffusion of sublimed vapors and especially those which rely solely upon temperature alone for evaporation, heat levels are required which involve the melting points of the solids, with the result that the charges become molten and coagulated, and evaporation depends entirely upon conducted and radiated heat. Also under these operations there is established conditions of more pronounced heat level contrast between nethermost regions of the charge where the heat is being applied and uppermost areas thereof where the field of evaporation is active. Because these masses, after becoming fused and matted, become layers of increased heat insulation, the factor of heat discrepancy becomes more aggravated. Thus, while a beginning charge may be expected to yield a liberal amount of evaporation with a given stimulation of heat, usually due to the melting and sealing up of the charge, a substantial increase over the normal melting temperature is required in order to penetrate the thickness of the charge and to establish the proper evaporation rate at the top surface.

Also in systems which depend solely upon heat for evaporation there is generated a blanket layer of the heavier liberated gases which lie over the solids unless compelled to spill over by air drafts spasmodically. This condition makes for a greater concentration of gas and atmosphere admixture in the environs immediately surrounding the vapor generating device, with diffusion throughout the space chamber remaining in an unbalanced condition.

In order to better understand the improved practices which are embodied in the present invention, reference will now be had to the accompanying drawing in which there is illustrated equipment for accomplishing the purposes thereof. In the detailed specification which follows and in the accompanying drawing like reference numerals have been employed to designate corresponding parts throughout.

Fig. 1 is a transverse vertical sectional view through an evaporating apparatus constructed in accordance with the teachings of the present invention;

Fig. 2 is an enlarged fragmentary sectional view through the upper portion of the apparatus illustrated in Fig. 1; and, Fig. 3 is a transverse vertical sectional view through a modified embodiment of structure utilizing certain features of the present invention.

A cylindrical housing 11 which may be made of metal or firm asbestos is disposed with its axial center vertical, so that it may perform as a chimney, being open at the bottom 12 for the purpose of admitting incoming air currents and at the top 17 which encompasses a disc or receptacle 16. A supporting spider 13 secured suitably to the bottom of the container 11 is provided with a light bulb socket 14, having threads and contacts for receiving a conventional base of a standard household electric light bulb 15 serving the purpose of a moderate heat generator which stimulates the chimney effect by heating contained gases and causing them to rise within the housing 11.

The top of the container 11 is closed by being fitted with a shallow preformed basin or dished receptacle 16 advantageously constructed of woven metal wire and for durability made of stainless steel or Monel metal so that it may withstand corrosive or oxidizing influences.

The dish or basin 16 has been illustrated in the preferred embodiment portrayed in Figs. 1 and 2 as affixed to the housing member 11 at its top level so that the charge of evaporable chemical solids 18 such as the gamma isomer of benzene hexachloride, when placed in position for operation will be secure and stable while permitting of no caching or pocketing of liberated gases thereover. The disc which forms dish 16 should be perforated or otherwise porous or if of woven stock, of such an open mesh that it will freely admit the passage of air as a consequence of the chimney action, but yet, be fine enough in respect to its apertures or interstices to prevent the crystals of chemical solids which form the mass 18 from sifting through perceptibly.

When this apparatus is employed for the purpose of accelerating the vaporization of the gamma isomer of benzene hexachloride, commercially known as Lindane, ideal operating conditions have been experimentally proved under conditions where the chimney housing is comprised of a cylindrical tubing having an inside diameter of 3¾ inches and an overall length of 6½ inches. Under such conditions and with the use of commercial Lindane an ideal retentive quality may be achieved by the use of the wire mesh, Monel metal screen constructed after the manner known commercially as "Dutch Twill" and employing a 60 x 200 mesh. This device may be heated with an ordinary electric light bulb rated at 40 watts or with an equivalent electric heating element disposed at from 2½ to 3½ inches below the bottom surface of the dish 16.

For convenience in mounting, the described vaporizer may be carried upon a wall mount bracket so designed that it will not impair nor obstruct the free flow of replacement atmosphere through the bottom aperture 12 as the device is disposed in an erect or upright position after the manner illustrated in Fig. 1.

In operation this device has been observed to generate a low level of heat output which under normal room temperature conditions will range between 50° and 65° C. (122° to 149° F.), a level far below the melting point. After several hours of continuous evaporation a charge of Lindane supported after the manner illustrated in Fig. 1 may undergo a caking or integration which will make it possible to remove the charge in the form of a pellet, but under these conditions of operation the porosity through its core will not be impaired, nor will its bottom layer become perceptibly molten. The recognized minimum fusion temperature of Lindane is at 110° C. so that even under cumulative conditions the device constructed in accordance with these teachings will incur no risk of approaching any unsafe operating conditions.

It is called to attention that in lieu of a metallic or other formed supporting dish any other base member which may possess an effective degree of porosity, such as for example, porcelain may be substituted instead. In contrast with other modes of operation, charges consisting of layers of granular volatile solids responsive to the type of vaporization here proposed, while effecting a caking of the layer into a spongy pellet, permits the operation to continue, nevertheless, without diminution of permeability. In fact, under tests observed under continuous operation and with evaporation taking place through the core areas of the layer as well as at its surface areas the transverse interstices become naturally enlarged permitting the evaporation and chimney effect flow to continue to operate with increased ease and diminishing retardation.

Different sized rooms, as well as different conditions of changing atmosphere may require some method of control respecting the vapor output of these devices in order to achieve effective and sustained concentrations. One or two of these devices will adequately serve to maintain about 20,000 cubic feet of space under treatment.

Because of its physical stimulation toward increased evaporation, as explained, systems employing the herein proposed devices and methods of operation may practice the more efficient and economical utilization of the solid substances in their pure form with or without admixture with diluents or stabilizers regardless of whether they are required under other methods of operation in order to secure the desired behavior characteristics and rates of evaporation. It will be understood, of course, that evaporation may be increased by raising the heat level of the air stream and/or increasing the heat radiated to the solid bed in devices constructed in accordance with the present invention. One mode of regulating may be had by changing the wattage of light bulb or other heating device thereby regulating the rate of vaporization. Alternatively, this rate of vaporization may be regulated by changing the relative distance between the heater and basin 16 either as shown in Fig. 3 where an internal ledge for supporting the placement ring 21 may be adjusted by being constructed of an elastic expandable substance or by being positioned or glued at different levels or distances away from the heater 22, or preferably by vertically adjusting the position of the source of heat with respect to a fixed position of the basin 16.

Under other modes of operation the formation of a large reservoir space at the top of the columnar fixture tends to choke off or deter the free flow of liberated gases causing them to be discharged spasmodically and irregularly. In a device constructed and operated under the present invention, however, this effect is considerably if not totally eliminated by the enforced inflow which sweeps the accumulated gases out into the larger chamber space rather than to permit them to collect and become concentrated. Hence, it is considered that the admixture or diffusion of insecticidal or germicidal gases, when executed in accordance with the provisions of the herein disclosed structure and method of operation will serve to maintain a more nearly even and homogeneous concentration throughout the principal space chamber.

While the present invention has been explained and described with reference to certain illustrative modes of operation and specific contemplations of structural features it will be understood, nevertheless, that various changes and modifications are susceptible of being incorporated without departure from the essential scope or spirit thereof. Accordingly, it is not intended for an understanding of the invention to be limited to the particular language employed in the foregoing specification nor to the pictorial illustrations of the accompanying drawing except as indicated in the hereunto appended claims.

What is claimed is:

1. Apparatus for the vaporization of sublimate solids which comprises in combination an air impermeable cylindrical housing member defining a substantially vertical cylindrical passageway having openings at both ends thereof, an electric heater disposed in said passageway with sufficient surrounding clearance to permit intake of replacement air from the bottom opening of said passageway, a supporting basin positioned between about 2½ and about 3½ inches above said heater within the upper portion of said passageway of said housing member forming a lower induction section below said basin and an upper chimney section above said basin, said basin comprising a disc coextensive with said passageway of said cylindrical housing member and made of porous rigid material and capable of supporting a layer of evaporable solids so that rising air currents induced by said electric heater in said air induction section passes upward from the bottom opening of said passageway at a temperature below the melting point of said evaporable solids through said porous basin and its contained evaporable solids and through said chimney section for the purpose of accelerating vaporization and means for regulating the distance between said heater and said basin.

2. A method for subliming sublimable solids which comprises heating air within a confined passageway to a temperature below the melting point of said sublimate solids such that a current of heated air is induced, supporting a pervious layer of sublimate solids within said confined passageway at a substantial distance above the zone of heating such that said induced currents of heated air percolate through said pervious layer of sublimate solids at a temperature below the melting point of said solids and maintaining said solids substantially below their melting point during contact with said heated air thereby subliming sublimate solids without melting the solids at a rate limited by the induced air circulation.

3. A method for subliming Lindane which comprises heating air within a confined elongated passageway to a temperature less than 75° C. such that a current of heated air is induced, supporting a pervious layer of Lindane within said confined passageway below the upper outlet thereof and at a substantial distance above the zone of heating such that said induced currents of heated air percolate through said pervious layer of Lindane at a temperature below its melting point and maintaining said solids below 75° C. during contact with said heated air thereby subliming the Lindane without melting the solids at a rate limited by the induced air circulation.

4. A method for subliming Lindane which comprises heating air within a confined passageway to a temperature between 50 and 65° C. such that a current of heated air is induced, supporting a pervious layer of Lindane within said confined passageway at a substantial distance above the zone of heating such that said induced currents of heated air percolate through said pervious layer of Lindane at a temperature below its melting point and maintaining said solids between 50 and 65° C. thereby subliming the Lindane without melting the solids at a rate limited by the induced air circulation.

References Cited in the file of this patent

UNITED STATES PATENTS

| | | |
|---|---|---|
| 1,975,082 | Bucy | Oct. 2, 1934 |
| 1,988,617 | Adams | Jan. 22, 1935 |
| 1,992,684 | Weinberger | Feb. 26, 1935 |
| 2,143,246 | McGary | Jan. 10, 1939 |
| 2,180,213 | Peake | Nov. 14, 1939 |
| 2,501,496 | Cartwright | Mar. 21, 1950 |
| 2,513,919 | Costello | July 4, 1950 |
| 2,541,637 | Christopher et al. | Feb. 13, 1951 |
| 2,591,818 | Huff | Apr. 8, 1952 |
| 2,616,024 | Laibow | Oct. 28, 1952 |